(12) United States Patent
Yamaguchi et al.

(10) Patent No.: US 6,882,099 B2
(45) Date of Patent: Apr. 19, 2005

(54) PHOSPHOR FOR DISPLAY AND FIELD-EMISSION DISPLAY

(75) Inventors: Kenichi Yamaguchi, Kanagawa (JP); Kiyoshi Inoue, Tokyo (JP); Susumu Matsuura, Kanagawa (JP); Takeo Ito, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/240,750

(22) PCT Filed: Apr. 11, 2001

(86) PCT No.: PCT/JP01/03108

§ 371 (c)(1),
(2), (4) Date: Oct. 10, 2002

(87) PCT Pub. No.: WO01/77254

PCT Pub. Date: Oct. 18, 2001

(65) Prior Publication Data

US 2003/0132699 A1 Jul. 17, 2003

(30) Foreign Application Priority Data

Apr. 11, 2000 (JP) ........................ 2000-109272
Nov. 30, 2000 (JP) ........................ 2000-364492

(51) Int. Cl.[7] ................... H01J 29/20; H01J 29/32; H01J 31/12; C09K 11/56; C09K 11/78
(52) U.S. Cl. .................. 313/495; 252/301.4 S
(58) Field of Search .................... 313/495–497, 313/486, 309, 339, 351; 252/301.6 S, 301.4 S

(56) References Cited

U.S. PATENT DOCUMENTS

| | | | | |
|---|---|---|---|---|
| 3,575,627 A | * | 4/1971 | Nicoll | ......................... 313/467 |
| 3,970,582 A | * | 7/1976 | Fan et al. | ............. 252/301.6 S |
| 4,208,613 A | * | 6/1980 | Hase et al. | ................. 313/495 |
| 4,272,397 A | * | 6/1981 | Fukuda et al. | ........ 252/301.6 S |
| 5,814,932 A | * | 9/1998 | Matsuda et al. | ............ 313/461 |
| 6,604,972 B1 | * | 8/2003 | Yamano | ...................... 445/24 |

FOREIGN PATENT DOCUMENTS

| | | |
|---|---|---|
| EP | 0078538 | 5/1983 |
| EP | 816469 | 1/1998 |
| JP | 58-135589 | 10/1981 |
| JP | 57-133180 | 8/1982 |
| JP | 62-095378 | 5/1987 |
| JP | 2-255791 | 10/1990 |
| JP | 11-349937 | 12/1999 |
| KR | 1998-019750 | 6/1998 |
| KR | 1999-86690 | 12/1999 |
| WO | 96/09353 | 3/1996 |

* cited by examiner

*Primary Examiner*—Ashok Patel
(74) *Attorney, Agent, or Firm*—Oblon, Spivak, McClelland, Maier & Neustadt, P.C.

(57) ABSTRACT

Phosphors for a display, which emit blue light and green light, comprise zinc sulfide phosphors having a crystal structure of a hexagonal system. The zinc sulfide phosphor which emits blue light has an average particle diameter in a range of $(0.0169 \times V_E^{1.9} + 2.49) \pm 20\%[\mu m]$ when an electron beam has an acceleration voltage $V_E$. The zinc sulfide phosphor which emits green light has an average particle diameter in a range of $(0.017 \times V_E^{1.9} + 2.58) \pm 20\%[\mu m]$. A phosphor for a display, which emits red light, comprises a yttrium oxysulfide phosphor or a yttrium oxide phosphor and has an average particle diameter in a range of $(0.023 \times V_E^{1.95} + 2.88) \pm 20\%[\mu m]$. These phosphors for a display are used for a display which has an electron beam having an acceleration voltage of 3 kV to 15 kV as an excitation source.

13 Claims, 1 Drawing Sheet

PHOSPHOR FOR DISPLAY AND FIELD-EMISSION DISPLAY

TECHNICAL FIELD

The present invention relates to a phosphor for a display which is to be used for a flat display, and a field-emission display using it.

BACKGROUND ART

For a display which becomes a core device of a digital network with the approach of the multimedia age, there is demanded a display which is made to have a high resolution, a thinner thickness, a large screen, and the like. As a display, devices using a cathode lay tube (CRT) have been used extensively, but a thin and high resolution self-luminous type display is now demanded because the CRT increases its installing space and weight as the CRT is made large (to have a larger screen).

In response to such a demand, a plasma display panel (PDP) has been put to practical use. The PDP can display various types of information finely with a high resolution and has characteristics that it can be produced to have a large and thin screen. But, the PDP does not necessarily have sufficient performance as compared with the CRT in view of brightness, contrast, color reproducibility, power consumption and the like.

Meanwhile, a display using electron emission elements such as a field-emission cold cathode, which is a so-called field-emission display (FED), has the same basic display principle as that of the CRT and similar performance as that of the CRT. Specifically, the FED is receiving attention as a thin image display or the like because it has characteristics such as a wide viewing angle, a quick response speed and a small power consumption in addition to the basic display performance such as brightness, contrast and color reproducibility.

The FED has a rear plate, which has many electron emission type electron emission elements formed as electron sources on a substrate, and a face plate which is formed of a glass substrate or the like on which a phosphor layer is formed. The rear plate and the face plate are disposed to face each other with a small gap between them. The gap between these plates is sealed airtight in a vacuum state.

Incidentally, the phosphor layer for the FED has not been necessarily studied sufficiently. Under present circumstances, phosphors for emission of blue light, green light and red light are selectively used based on experiences from the phosphors which have been used for the CRT. For example, for a blue light-emitting phosphor and a green light-emitting phosphor, it is being considered using a ZnS:Ag phosphor and a ZnS:Cu, Al phosphor having a crystal structure of a cubic system for the CRT excelling in emission luminance. It is also considered using a $Y_2O_2S$:Eu phosphor or the like for the red light-emitting phosphor.

However, simple diversion of the phosphors for emission of blue, green and red light of the CRT to the FED causes problems that the phosphor layer gets burn-in (deterioration of the phosphors) incident to the display operation of the FED and emission characteristics deteriorate with time. Degradation of the phosphors with time is particularly prominent in the blue light-emitting phosphor and the green light-emitting phosphor. When luminance of the phosphors for the FED degrades with time, the emission colors of the FED change, resulting in generation of a color drift.

The cause of the above-described degradation of the characteristics of phosphors for the FED is not fully clarified yet, but it is considered being caused by a fact that an acceleration voltage (excitation voltage) of the electron beam for making the phosphor layer emit light is lower than that for the CRT. Specifically, the CRT has an acceleration voltage of 25 kV to 30 kV, while the FED has a low acceleration voltage of approximately 3 kV to 15 kV for the electron beam.

As described in, for example, Japanese Patent Laid-Open Application Nos. 2-255791 JP-A and 11-349937 JP-A, it is proposed to use a phosphor, which has 50% or more of a crystal structure formed of ZnS:Ag, Al or ZnS:Ag, M, Al (M is at least one selected from Au and Cu, and a content of M is in a range of 0.1 to 10 ppm) of a hexagonal system, as a blue light-emitting phosphor for the CRT.

But, because such a blue light-emitting phosphor is based on the premise that it is used for a large CRT or the like, a general high voltage (27 kV in the above publications) is used as the acceleration voltage for the electron beam. Thus, it is described that the ZnS phosphor of the hexagonal system is effective in improving the current characteristic of a high current area side, but there is nothing described about a case that the electron beam has a low acceleration voltage of 3 kV to 15 kV. In other words, it is not considered at all that the ZnS phosphor of the hexagonal system described in the above publications is used for the FED.

Japanese Patent Laid-Open Application No. 62-95378 JP-A describes that the ZnS phosphor having a content of a hexagonal system in a range of 0.5 to 12% is used as a blue light-emitting phosphor for the CRT. This ZnS phosphor just has an improved current characteristic of the CRT that the acceleration voltage for the electron beam is high, and there is no disclosure about a case that the electron beam has a low acceleration voltage of 3 kV to 15 kV. The ZnS phosphor, which contains the hexagonal system at a prescribed ratio, is not considered to be used for the FED at all. The above-described publications indicate that when a content of the hexagonal system exceeds 12% and the acceleration voltage is 20 kV, emission intensity lowers.

It is an object of the present invention to provide a phosphor for a display which enables to keep good emission luminance for a long time when it is used as a phosphor or the like for the FED, while suppressing degradation of a characteristic (luminance degradation) with time which may result from a low acceleration voltage of an electron beam. It is also an object to provide a field-emission display which has improved display characteristics and reliability and a life characteristic also improved by using such a phosphor for a display.

DISCLOSURE OF THE INVENTION

The inventors have made repeated researches and experiments about the cause of degradation of the characteristics of the phosphor for an FED in order to suppress the degradation of emission luminance with time of phosphors for emission of blue light and green light used for the FED. As a result, they found that because the FED has an acceleration voltage (a specific acceleration voltage of 3 kV to 15 kV) for the electron beam lower than that for the CRT, the electron beam penetrates a short distance into the phosphor, and an irradiation impact of the electron beam concentrates on the surface of the phosphor.

And, it was found that a crystal structure of a zinc sulfide phosphor, which was conventionally used as the phosphor for emission of blue and green light for the CRT, was effective to be a hexagonal system against the irradiation impact by the above low voltage electron beam. Because the zinc sulfide phosphor of the hexagonal system excels in impact resistance, the luminance characteristic can be kept for a long time even when the irradiation impact of the electron beam concentrates on the surface of the phosphor. By suppressing the phosphor for a display from having luminance degraded with time, a change in the emission color of the FED or the like with time, namely a color drift, can be prevented. Therefore, the display performance of the FED or the like can be maintained stably.

Besides, it was found that deterioration of luminance of the phosphor with time is involved by a relation between the acceleration voltage of the electron beam and the particle diameter of the phosphor. Specifically, electrons accelerated by a high voltage are easy to pass through the phosphor particles, so that extra energy which does not contribute to the emission promotes the degradation. In this connection, the degradation becomes small as the phosphor has a larger particle diameter. Meanwhile, when the acceleration voltage for the electron beam is lowered, the electron beam cannot completely pass through when the particle diameter becomes a prescribed level or higher and remains within the phosphor, resulting in promotion of the degradation. It means that the particle diameter of the phosphor particles has a range suitable for a certain acceleration voltage of the electron beam, and the particle diameter of the optimum phosphor particles becomes small as the acceleration voltage becomes low.

Accordingly, by selecting the phosphor having a particle diameter through which the emitted electrons pass or in which the emitted electrons do not remain, deterioration in characteristics of the phosphor with time resulting from a low acceleration voltage of the electron beam can be suppressed. Especially, for the phosphors for emission of blue light and green light, which are heavily degraded as compared with the red light-emitting phosphor, lowering of luminance of the phosphor with time can be suppressed more effectively by using the zinc sulfide phosphor of the hexagonal system and optimizing the particle diameter.

The present invention was achieved on the basis of the above-described knowledge. A first phosphor for a display of the present invention is a phosphor for a display which is provided with a zinc sulfide phosphor which is excited by an electron beam having an acceleration voltage of 3 kV to 15 kV to emit blue light, wherein the zinc sulfide phosphor has a crystal structure of a hexagonal system. The first phosphor for a display has the zinc sulfide phosphor for emission of the blue light, which has an average particle diameter in a range of $(0.0169 \times V_E^{1.9} + 2.49) \pm 20\%[\mu m]$ when the electron beam has an acceleration voltage $V_E$ (kV).

A second phosphor for a display of the present invention is a phosphor for a display which is provided with a zinc sulfide phosphor which is excited by an electron beam to emit green light, wherein the zinc sulfide phosphor has a crystal structure of a hexagonal system. The second phosphor for a display is excited by an electron beam having an acceleration voltage of 3 kV to 15 kV for example. This second phosphor for a display further has the zinc sulfide phosphor for emission of the green light, which has an average particle diameter in a range of $(0.017 \times V_E^{1.9} + 2.58) \pm 20\%[\mu m]$ when the electron beam has an acceleration voltage $V_E$ (kV).

A third phosphor for a display of the present invention is a phosphor for a display which is provided with a yttrium oxysulfide phosphor or a yttrium oxide phosphor which is excited by an electron beam having an acceleration voltage of 3 kV to 15 kV to emit red light, wherein the yttrium oxysulfide phosphor or the yttrium oxide phosphor has an average particle diameter in a range of $(0.023 \times V_E^{1.95} + 2.88) \pm 20\%[\mu m]$ when the electron beam has an acceleration voltage $V_E$ (kV).

A field-emission display of the present invention comprises a back substrate having electron emission elements; a front substrate which is disposed to face the electron emission elements and which has a phosphor layer which emits light by an electron beam emitted from the electron emission elements; and means which seal airtight a gap between the back substrate and the front substrate. In this field-emission display, the phosphor layer contains at least one selected from a blue light emission component having the first phosphor for a display of the present invention, a green light emission component having the second phosphor for a display of the present invention, and a red light emission component having the third phosphor for a display of the present invention.

BEST MODE FOR IMPLEMENTING THE INVENTION

Figure 1:
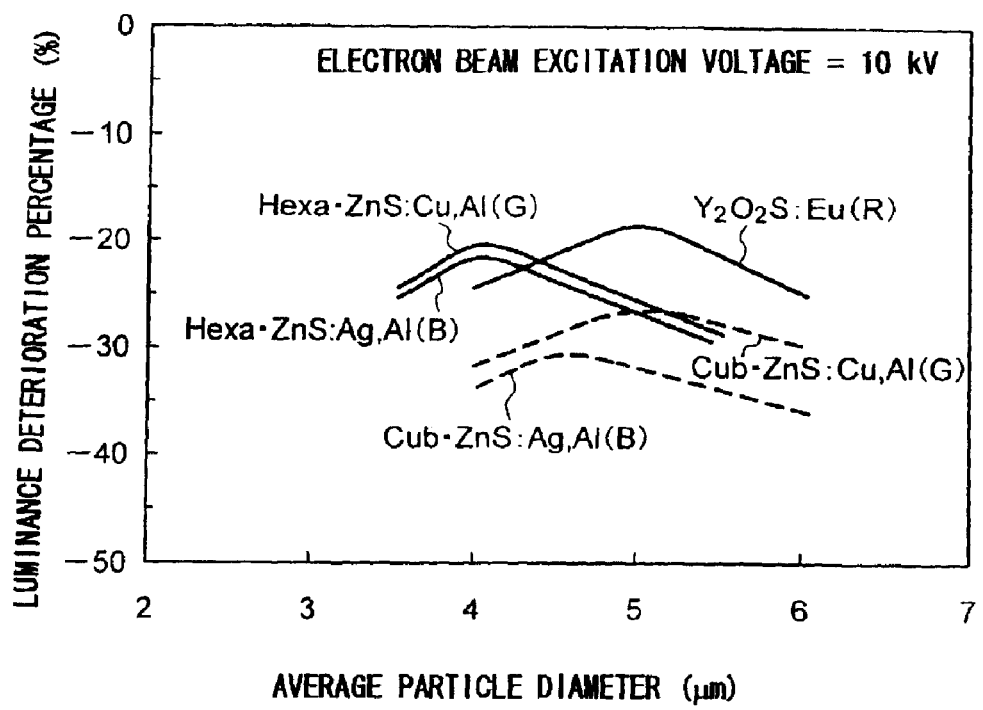
FIG. 1 is a diagram showing a relation between a particle diameter of a phosphor for a display according to the present invention and a luminance deterioration percentage when excited by an electron beam having an acceleration voltage of 10V.

Embodiments for implementing the present invention will be described below.

The first phosphor for a display of the present invention comprises a zinc sulfide phosphor which emits blue light when an electron beam having an acceleration voltage of 3 kV to 15 kV is emitted, and this zinc sulfide phosphor has a crystal structure of a hexagonal system. As such a zinc sulfide phosphor which emits blue light, one substantially having a composition indicated by:

$$\text{the general formula: } ZnS:Ag_a, M_b, Al_c \quad (1)$$

(wherein, M indicates at least one kind of element selected from Au and Cu; a, b and c indicate an amount against 1 g of zinc sulfide (ZnS) which is a mother phosphor; Ag is in a range of $1 \times 10^{-6} \leq a \leq 2 \times 10^{-3}$ g, M is in a range of $0 \leq b \leq 3 \times 10^{-5}$ g, Al is in a range of $1 \times 10^{-5} \leq c \leq 5 \times 10^{-3}$ g) is exemplified.

In the above formula (1), Ag as the main activator is an element essential for making the zinc sulfide phosphor emit blue light. If a content (activating amount) of Ag is excessively small or excessively large, emission luminance or emission chromaticity lowers. In order to obtain good emission of blue light and also to enhance luminance of the blue light emission, the content of Ag is preferably in a range of $1 \times 10^{-6}$ to $2 \times 10^{-3}$ g against 1 g of ZnS as the mother phosphor. A more preferable range of the content of Ag is $1 \times 10^{-5}$ to $1 \times 10^{-3}$ g against 1 g of ZnS, and further more preferably $5 \times 10^{-5}$ to $5 \times 10^{-4}$ g.

Element M (at least one element selected from Au and Cu) as a first co-activator serves to correct emission chromaticity which is slightly varied when a ZnS:Ag phosphor has a crystal structure of a hexagonal system. In order to satisfy the emission chromaticity which is required for the blue light-emitting phosphor for a display, the content of the element M is preferably adjusted appropriately in a range of 0 to $3\times10^{-5}$ g against 1 g of ZnS which is the mother phosphor. By containing the element M in such a range, for example, blue light emission which has emission chromaticity with a CIE chromaticity value (x, y) of (0.16±0.01, 0.055±0.02) can be obtained stably.

For example, emission chromaticity of a ZnS:Ag, Al phosphor of a cubic system is (x, y)=(0.151, 0.063) in the CIE chromaticity value, but emission chromaticity of the ZnS:Ag, Al phosphor of a hexagonal system is (x, y)= (0.158, 0.041). When 2 ppm of Cu is added to the ZnS:Ag, Al phosphor of a hexagonal system, the emission chromaticity becomes (0.16, 0.063), and when 10 ppm of Au is added, the emission chromaticity becomes (0.161, 0.063).

When the content of the element M exceeds $3\times10^{-5}$ g against 1 g of ZnS as the mother phosphor, the emission chromaticity deviates from the optimum range. The element M can be appropriately added depending on target emission chromaticity, but it is preferable to adjust the content of the element M to $0.5\times10^{-6}$ g or more against 1 g of ZnS to obtain effectively a color correction effect by the element M. A more preferable content of the element M is in a range of $0.5\times10^{-6}$ to $2.5\times10^{-5}$ g against 1 g of ZnS.

But, for the element M as a first co-activator, Cu has a color correction effect about 3 times greater than that of Au, so that it is desirable to adjust its content appropriately depending on whether either Au or Cu is selected. When Au is applied as the element M, its content is preferably $2\times10^{-5}$ g or less against 1 g of ZnS. A more desirable content of Au is in a range of $5\times10^{-6}$ to $1.5\times10^{-5}$ g. And, when Cu is applied, it is desired to be $5\times10^{-6}$ g or less against 1 g of ZnS. A more preferable content of Cu is in a range of $2\times10^{-6}$ to $5\times10^{-6}$ g.

When Au is solely added as the first co-activator, it is preferable to apply a composition which is substantially indicated by:

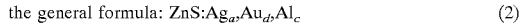

the general formula: $ZnS:Ag_a,Au_d,Al_c$ (2)

(where, a, d and c indicate an amount against 1 g of zinc sulfide (ZnS) as a mother phosphor, Ag is in a range of $1\times10^{-6} \leq a \leq 2\times10^{-3}$ g, Au is in a range of $0 \leq d \leq 1.5\times10^{-5}$ g, and Al is in a range of $1\times10^{-5} \leq c \leq 5\times10^{-3}$ g).

When Cu is solely added as the first co-activator, it is preferable to apply a composition which is substantially indicated by:

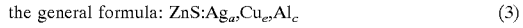

the general formula: $ZnS:Ag_a,Cu_e,Al_c$ (3)

(where, a, e and c indicate an amount against 1 g of zinc sulfide (ZnS) as the mother phosphor, Ag is in a range of $1\times10^{-6} \leq a \leq 2\times10^{-3}$ g, Cu is in a range of $0 \leq e \leq 5\times10^{-6}$ g, and Al is in a range of $1\times10^{-5} \leq c \leq 5\times10^{-3}$ g).

Al as a second co-activator is a component which contributes to improvement of emission luminance of a ZnS:Ag phosphor. If a content of Al is excessively large or excessively small, emission luminance is deteriorated. Therefore, it is preferable that the content of Al is in a range of $1\times10^{-5}$ to $5\times10^{-3}$ g against 1 g of ZnS as the mother phosphor. If the content of Al deviates from the above range, emission chromaticity as blue light emission is also deteriorated. A more preferable content of Al is in a range of $2\times10^{-5}$ to $3\times10^{-3}$ g, and a further more preferable content is $5\times10^{-5}$ to $1\times10^{-3}$ g.

A zinc sulfide phosphor having a crystal structure of a hexagonal system excels in degradation resistance based on its crystal structure. Here, when an electron beam having a low acceleration voltage of 3 kV to 15 kV is emitted to the phosphor, the irradiation impact of the electron beam concentrates on the surface of the phosphor because the electron beam has a short penetration depth. The zinc sulfide phosphor having a crystal structure of a hexagonal system has good resistance against the electron beam impact, so that good emission characteristic can be maintained for a long period even if the irradiation impact of the electron beam concentrates on the surface. Besides, the emission chromaticity which is required by the blue light-emitting phosphor for a display can be satisfied according to the composition of the zinc sulfide phosphor.

According to the first phosphor for a display (blue light-emitting phosphor) of the present invention, when a mother crystal structure of the zinc sulfide phosphor is determined to be a hexagonal system excelling in degradation resistance and the electron beam having an acceleration voltage in a range of 3 kV to 15 kV is emitted, blue light having emission chromaticity with an x value in a range of 0.15 to 0.17 and a y value in a range of 0.035 to 0.075 in CIE chromaticity value (x, y) can be obtained stably. Therefore, when a display such as an FED is configured using the blue light-emitting phosphor of the present invention, the reliability and life characteristics of the FED can be improved while keeping the display characteristics such as luminance and chromaticity.

Besides, the above-described zinc sulfide phosphor, which has the crystal structure of the hexagonal system, for the blue light emission is desired to have an average particle diameter as the phosphor powder adjusted according to an acceleration voltage of the electron beam of a display using it. In other words, it is preferable that the zinc sulfide phosphor powder for the blue light emission has an average particle diameter in a range expressed by:

the formula A: $(0.0169 \times V_E^{1.9} + 2.49) \pm 20\% [\mu m]$ when the electron beam used for the display has an acceleration voltage $V_E$ (3 kV to 15 kV).

As shown in FIG. 1, when an average particle diameter of a hexagonal zinc sulfide phosphor (Hexa-ZnS:Ag, Al(B)) for blue light emission is increased when the electron beam has a prescribed acceleration voltage $V_E$ (10 kV in FIG. 1), a luminance deterioration percentage with time increases. It is because when the electron beam has a low acceleration voltage $V_E$ in a range of 3 kV to 15 kV, the electron beam cannot pass through the phosphor if the phosphor particles have a particle diameter exceeding a prescribed level, and electrons remain within the phosphor particles to promote the degradation. The particle diameter which tends to make the electrons remain within the phosphor particles becomes smaller as the excitation voltage $V_E$ becomes smaller.

Therefore, it is desirable that the particle diameter of the phosphor particles is determined to be small depending on the acceleration voltage $V_E$ of the electron beam applied to the display. Specifically, for the hexagonal zinc sulfide phosphor for blue light emission, it is preferable that the phosphor powder has an average particle diameter in a range not exceeding $(0.0169 \times V_E^{1.9} + 2.49) + 20\% [\mu m]$. The emitted electrons are relatively smooth to pass through the zinc sulfide phosphor of the hexagonal system having such a particle diameter. In other words, the emitted electrons do not remain. Therefore, even when an electron beam which has a low acceleration voltage $V_E$ of 3 kV to 15 kV is emitted, it is possible to more effectively suppress the luminance of the zinc sulfide phosphor for blue light emission from degrading with time.

But, when the zinc sulfide phosphor powder of the hexagonal system has an excessively small average particle diameter, degradation of the phosphor particles as the whole is promoted inversely. Therefore, it is preferable that the hexagonal zinc sulfide phosphor powder for blue light emission has a lower limit value of the average particle diameter of $(0.0169 \times V_E^{1.9} + 2.49) - 20\% [\mu m]$.

As described above, when the average particle diameter of the zinc sulfide phosphor powder of the blue light emission is determined to fall in the range of the formula A according to the acceleration voltage $V_E$ of the electron beam used for a display, it is possible to suppress more effectively the luminance degradation with time caused when the electron beam which has a low acceleration voltage $V_E$ of 3 kV to 15 kV is emitted. When the display such as the FED is configured using the zinc sulfide phosphor for the blue light emission, the display performance can be maintained stably, and reliability and life characteristics can be improved.

It is seen as indicated by the dotted line in FIG. 1 that when the zinc sulfide phosphor for blue light emission has a crystal structure of a cubic system (Cub-ZnS:Ag, Al(B)), the degradation of luminance as the whole is substantially large as compared with that of a hexagonal zinc sulfide phosphor. Besides, the cubic zinc sulfide phosphor is different from a hexagonal zinc sulfide phosphor in terms of a range of a particle diameter with which luminance degradation is relatively small.

The second phosphor for a display of the present invention comprises a zinc sulfide phosphor which emits green light when the electron beam having an acceleration voltage of for example 3 kV to 15 kV, is emitted, and this zinc sulfide phosphor has a crystal structure of a hexagonal system. As such a zinc sulfide phosphor for green light emission, one substantially having a composition indicated by:

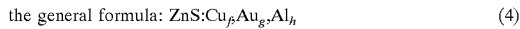

the general formula: $ZnS:Cu_f Au_g Al_h$ (4)

(where, f, g and h indicate an amount against 1 g of zinc sulfide (ZnS) which is a mother phosphor, Cu is in a range of $1 \times 10^{-5} \leq f \leq 1 \times 10^{-3}$ g, Au is in a range of $0 \leq g \leq 3 \times 10^{-4}$ g, and Al is in a range of $1 \times 10^{-5} \leq h \leq 5 \times 10^{-3}$ g) is exemplified.

In the above formula (4), Cu as the main activator is an element essential for making the zinc sulfide phosphor emit green light. When a content (activating amount) of Cu is excessively small or excessively large, emission luminance or emission chromaticity is lowered. In order to obtain good green light emission and to improve luminance of such green light emission, it is preferable that a content of Cu is in a range of $1 \times 10^{-5}$ to $1 \times 10^{-3}$ g against 1 g of ZnS which is a mother phosphor. A more preferable content of Cu is in a range of $2 \times 10^{-5}$ to $5 \times 10^{-4}$ g against 1 g of ZnS, and further more preferably in a range of $4 \times 10^{-5}$ to $3 \times 10^{-4}$ g against 1 g of ZnS.

Au as a first activator is to compensate emission chromaticity which changes slightly, namely shifting of emission chromaticity toward the blue color, when a crystal structure of a ZnS:Cu phosphor is a hexagonal system. In order to satisfy the emission chromaticity which is required for a green light-emitting phosphor for a display, it is desirable to appropriately adjust a content of Au in a range of 0 to $3 \times 10^{-4}$ g against 1 g of ZnS which is a mother phosphor. By containing Au in such a range, it becomes possible to stably obtain green light emission which has, for example, emission chromaticity with the CIE chromaticity value (X, y) of (0.24±0.03, 0.6±0.02).

For example, emission chromaticity of a ZnS:Cu, Al phosphor of a cubic system has the CIE chromaticity value (x, y)=(0.294, 0.620), but emission chromaticity of the ZnS:Cu, Al phosphor of a hexagonal system is (x, y)=(0.218, 0.589). When 100 ppm of Au is added to such a ZnS:Cu, Al phosphor of a hexagonal system, emission chromaticity becomes (0.247, 0.602).

When the content of Au exceeds $3 \times 10^{-4}$ g against 1 g of ZnS which is a mother phosphor, emission chromaticity deviates from the optimum range. Au can be added appropriately according to target emission chromaticity, but in order to effectively obtain a color correction effect by Au, it is preferable that a content of Au is $1 \times 10^{-5}$ g or more against 1 g of ZnS. A more preferable content of Au is in a range of $1 \times 10^{-5}$ to $2 \times 10^{-4}$ g against 1 g of ZnS, and further more preferably in a range of $3 \times 10^{-5}$ to $1.5 \times 10^{-4}$ g.

Al as a second co-activator contributes to improvement of emission luminance of the ZnS:Cu phosphor. If the content of Al is excessively large or small, the emission luminance is degraded. Therefore, it is preferable that the content of Al is in a range of $1 \times 10^{-5}$ to $5 \times 10^{-3}$ g against 1 g of ZnS which is a mother phosphor. If the content of Al deviates from the above range, emission chromaticity for green light emission is also degraded. A more preferable content of Al is in a range of $2 \times 10^{-5}$ to $3 \times 10^{-3}$ g against 1 g of ZnS, and a further more preferable content is in a range of $5 \times 10^{-5}$ to $3 \times 10^{-3}$ g.

As described above, the zinc sulfide phosphor having a crystal structure of a hexagonal system excels in degradation resistance according to its crystal structure. Specifically, for the second phosphor for a display (a green light-emitting phosphor for a display), degradation of luminance with time which is caused when the electron beam having an acceleration voltage in a range of 3 kV to 15 kV is emitted can be suppressed on the basis of the crystal structure of the hexagonal system. Besides, on the basis of the composition of the zinc sulfide phosphor, emission chromaticity which is required for the green light-emitting phosphor for a display can be satisfied.

According to the second phosphor for a display (green light-emitting phosphor) of the present invention, when a mother crystal structure of the zinc sulfide phosphor is determined to be a hexagonal system excelling in degradation resistance and the electron beam having an acceleration voltage in a range of 3 kV to 15 kV is emitted, green light having emission chromaticity with a value x in a range of 0.21 to 0.27 and a value y in a range of 0.58 to 0.62 in the CIE chromaticity value (x, y) can be obtained stably. Therefore, when a display such as the FED is configured using the green light-emitting phosphor of the present invention, reliability and life characteristics of the FED can be improved while keeping display characteristics such as luminance and chromaticity.

Besides, it is preferable that the above-described zinc sulfide phosphor for the green light emission having the crystal structure of the hexagonal system adjusts the average particle diameter of the phosphor powder according to the acceleration voltage of the electron beam of the display using it. Specifically, it is preferable that the zinc sulfide phosphor powder for the green light emission has an average particle diameter in a range indicated by:

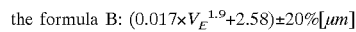

the formula B: $(0.017 \times V_E^{1.9} + 2.58) \pm 20\% [\mu m]$ when the electron beam used for the display has an acceleration voltage $V_E$ (3 kV to 15 kV).

As shown in FIG. 1, a hexagonal zinc sulfide phosphor (Hexa-ZnS:Cu, Al(G)) for the green light emission has a luminance deterioration percentage which increases when the average particle diameter is increased in the same way as the hexagonal zinc sulfide phosphor for the blue light emission. Therefore, for the hexagonal zinc sulfide phosphor for the green light emission, it is preferable that the average particle diameter of the phosphor powder is adjusted to fall in a range not exceeding $(0.017 \times V_E^{1.9}+2.58)+20\%[\mu m]$. The emitted electrons are relatively smooth to pass through the zinc sulfide phosphor of a hexagonal system having such a particle diameter. Therefore, even when the electron beam with a low acceleration voltage $V_E$ of 3 kV to 15 kV is emitted, it becomes possible to more effectively suppress the degradation of luminance with time of the zinc sulfide phosphor for green light emission.

But, when the average particle diameter of the zinc sulfide phosphor powder of the hexagonal system is made excessively small, degradation of the phosphor particles as the whole is promoted conversely. Therefore, it is preferable that the hexagonal zinc sulfide phosphor powder for the green light emission is determined to have a lower limit value of $(0.017 \times V_E^{1.9}+2.58)-20\%[\mu m]$ for the average particle diameter.

As described above, by adjusting the average particle diameter of the zinc sulfide phosphor powder for the green light emission to fall in the range of the expression B according to the acceleration voltage $V_E$ of the electron beam used for a display, luminance degradation with time when the electron beam having a low acceleration voltage $V_E$ of 3 kV to 15 kV can be suppressed more effectively. By configuring the display such as the FED using such a zinc sulfide phosphor for the green light emission, display performance can be maintained stably, and reliability and life characteristics can be improved.

As indicated by the dotted line in FIG. 1, it is seen that when the zinc sulfide phosphor for the green light emission has a crystal structure of a cubic system (Cub-ZnS:Cu, Al(G)), luminance degradation is large as the whole in comparison with that of the hexagonal zinc sulfide phosphor. Besides, the cubic zinc sulfide phosphor is different from a hexagonal zinc sulfide phosphor in terms of a range of a particle diameter with which luminance degradation is relatively small.

Here, the crystal structure of the zinc sulfide phosphor configuring the first and second phosphors for a display of the present invention can be measured by a generally used X-ray diffraction. Namely, the hexagonal system has peaks of plane (100) and plane (002) appeared at the X-ray diffraction peak, but a conventional cubic system has the peak appeared on plane (111). Therefore, it can be checked according to a direction where the peak appears whether it has the crystal structure of the hexagonal system intended by the present invention. More specifically, an amorphous glass sample case (plate shape) having a recess of about 0.5 mm is used, phosphor powder is filled into the recess, the filled surface is smoothened to make it flat, and X-ray is emitted. Thus, it becomes possible to measure using a small amount of test sample.

And, the zinc sulfide phosphors which configure the first and second phosphors for a display of the present invention have a crystal structure of a hexagonal system, but when the ratio of the hexagonal system in the crystal structure is at least 50% or more, the effect being derived from the zinc sulfide phosphor of the hexagonal system of the present invention can be obtained substantially. It is preferable that the ratio of the hexagonal system in the zinc sulfide phosphor is 80% or more, and more preferably 95% or more. Especially, it is desirable that substantially the entire crystal structure of the zinc sulfide phosphor is of the hexagonal system.

The crystal structure of the zinc sulfide phosphor configuring the first and second phosphors for a display of the present invention and its ratio can be measured by the X-ray diffraction. Specifically, the ratio of the hexagonal system is calculated by the following formula on the basis of the X-ray diffraction diagram.

Ratio of the hexagonal system: H (%)=1.69B/(A+0.69B) (where, H is a content of ZnS of a hexagonal system, A is a height of a peak of diffraction line when the hexagonal system and the cubic system are overlapped, and B is a height of a peak of the diffraction line of ZnS of the hexagonal system with 2θ=51.7°.)

It is to be noted that the above formula is a formula derived from W. A. Steward's formula (R=B/A=H/1.69−0.69H).

A third phosphor for a display of the present invention comprises a yttrium oxysulfide phosphor or a yttrium oxide phosphor which emits red light by being excited by the electron beam having an acceleration voltage of 3 kV to 15 kV.

An example of such a yttrium oxysulfide phosphor for red light emission substantially has a composition indicated by:

$$\text{the general formula: } Y_2O_2S:Eu_i \qquad (5)$$

(where, i indicates an amount against 1 g of yttrium oxysulfide ($Y_2O_2S$) which is a mother phosphor and in a range of $5 \times 10^{-3} \leq i \leq 1 \times 10^{-1}$ g.)

And, an example of the yttrium oxide phosphor for the red light emission substantially has a composition indicated by:

$$\text{the general formula: } Y_2O_3:Eu_j \qquad (6)$$

(where, j indicates an amount against 1 g of yttrium oxide ($Y_2O_3$) which is a mother phosphor and in a range of $5 \times 10^{-3} \leq j \leq 1 \times 10^{-1}$ g).

In the above formulas (5) and (6), Eu as the activator is an element which makes the yttrium oxysulfide phosphor or the yttrium oxide phosphor emit red light, and if its content (activating amount) is excessively small or excessively large, emission luminance or emission chromaticity is lowered. In order to obtain good red light emission and also to enhance emission luminance of the red light emission, it is preferable that the content of Eu is in a range of $5 \times 10^{-3}$ to $1 \times 10^{-1}$ g against 1 g of $Y_2O_2S$ or $Y_2O_3$ which is a mother phosphor. A preferable content of Eu is in a range of $1 \times 10^{-2}$ to $8 \times 10^{-2}$ g against 1 g of $Y_2O_2S$ or $Y_2O_3$.

Besides, it is preferable that the yttrium oxysulfide phosphor or the yttrium oxide phosphor for the red light emission shows emission chromaticity with an x value in a range of 0.63 to 0.67 and a y value in a range of 0.32 to 0.35 in the CIE chromaticity value (x, y) when an electron beam having an acceleration voltage in a range of 3 kV to 15 kV is emitted. The characteristics required for the phosphor for a display can be satisfied by the red light-emitting phosphor which shows such emission chromaticity.

The above yttrium oxysulfide phosphor or the yttrium oxide phosphor for the red light emission has an average particle diameter adjusted as the phosphor powder depending on an acceleration voltage of the electron beam for a display using it. Specifically, the yttrium oxysulfide phosphor or yttrium oxide phosphor for red light emission has an average particle diameter falling in a range of:

$$\text{the formula C: } (0.023 \times V_E^{1.95}+2.88) \pm 20\%[\mu m]$$

when the electron beam used for the display has an acceleration voltage $V_E$ of (3 kV to 15 kV).

As shown in FIG. 1, the yttrium oxysulfide phosphor or the like for the red light emission has an increased luminance deterioration percentage when the average particle diameter is increased. Therefore, for the yttrium oxysulfide phosphor and the yttrium oxide phosphor for the red light emission, the average particle diameter of the phosphor powder is determined to a range not exceeding $(0.023 \times V_E^{1.95} + 2.88) + 20\%[\mu m]$. The emitted electrons are relatively easy to pass through the red light-emitting phosphor having such a particle diameter. Therefore, even when an electron beam having a low acceleration voltage $V_E$ of 3 kv to 15 kV is emitted, luminance degradation of the red light-emitting phosphor with time can be suppressed.

But, when the yttrium oxysulfide phosphor powder or the yttrium oxide phosphor powder for the red light emission is made to have an excessively small average particle diameter, degradation of the phosphor particles as the whole is promoted conversely. Therefore, the red light-emitting phosphor powder is determined to have the average particle diameter with a lower limit value of $(0.023 \times V_E^{1.95} + 2.88) - 20\%[\mu m]$.

According to the third phosphor for a display (red light-emitting phosphor) of the present invention, the yttrium oxysulfide phosphor powder or the yttrium oxide phosphor powder for the red light emission is determined to have an average particle diameter in the range of the formula C depending on the acceleration voltage $V_E$ of the electron beam used for a display, so that luminance degradation with time at the time of emission of an electron beam having a low acceleration voltage $V_E$ of 3 kV to 15 kV can be suppressed effectively. Therefore, when a display such as the FED is configured using the red light-emitting phosphor of the present invention, reliability and life characteristics of the FED can be improved while maintaining the display characteristics such as luminance and chromaticity.

The average particle diameter of the phosphor powder according to the present invention is rendered to be a value which is determined according to an air douche (penetration method). The air douche (penetration method) is a method to determine a specific surface area of a specimen from the penetration of a fluid passing through a powder charged layer and also an average particle diameter based on it. The air douche is a measuring method based on a Kozeny-Carman method, and specifically measures an average particle diameter of powder by a Blaine air permeability meter.

For example, the phosphor for a display of the present invention as described above is produced by the following way. First, a method for producing the first and second phosphors for a display (zinc sulfide phosphor) will be described.

First, a prescribed amount of an activator raw material is added to a ZnS raw material which is a mother phosphor, flux such as potassium chloride or magnesium chloride is added as required, and they are wet-blended. Specifically, the phosphor raw material is dispersed into ion-exchange water to form a slurry state, a desired amount of the activator and flux is added, and they are mixed by an agitator according to a conventional procedure. Mixing time may be determined in such a way that the activator is thoroughly dispersed, for example, mixing may be made for about 10 to 30 minutes.

Then, the slurry containing the phosphor raw material and the activator is moved into a drying vessel such as a vat, dried, for example, at 130° C. for about 20 hours by a dryer according to a common procedure to prepare a phosphor raw material. As the activator raw material, there are used, for example, silver nitrate for Ag, copper sulfate for Cu, chloroauric acid for Au, and aluminum nitrate for Al. Other compounds can also be used.

Such a phosphor raw material is charged together with an appropriate amount of sulfur and activated carbon into a heat resistant vessel such as a quartz crucible. At this time, it is preferable that sulfur is mixed with a dried phosphor raw material by a blender or the like for about 30 to 180 minutes for example, the mixture material is charged into a heat resistant vessel, and its surface is covered. It is baked in a sulfuric atmosphere such as a hydrogen sulfide atmosphere or a sulfur vapor atmosphere or in a reducing atmosphere (e.g., an atmosphere of 3 to 5% of hydrogen and remaining nitrogen). The baking conditions are significant in order to control a crystal structure of a mother phosphor (ZnS), and a baking temperature is determined to be in a range of 1030 to 1150° C. to obtain a crystal structure of a target hexagonal system.

By baking the phosphor raw material in the above temperature range, a zinc sulfide phosphor of a hexagonal system containing a prescribed amount of the activator can be obtained. When the baking temperature is less than 1030° C., a ratio of a cubic crystal occupying the crystal increases. Meanwhile, when the baking temperature exceeds 1150° C., crystal grains grow excessively, and it becomes difficult to form a dense phosphor surface. It is preferable that the baking time is 30 to 360 minutes depending on the determined baking temperature. When the baking time is excessively short, a mixed crystal of a hexagonal crystal and a cubic crystal might be formed. After baking, it is desirable to cooling quickly in order to prevent a phase change from a hexagonal crystal to a cubic crystal.

Besides, it is desired to select the conditions to be described below to make the above average particle diameter of a hexagonal zinc sulfide phosphor satisfy the above-described formula A (blue light-emitting phosphor) or formula B (green light-emitting phosphor). For example, it is preferable that an amount of flux to be mixed with the phosphor raw material is determined to be rather small. It is also desirable that the baking temperature is low or the baking time is short. In view of the above, a more preferable baking temperature of the zinc sulfide phosphor is in a range of 1050 to 1130° C., and a more preferable baking time is in a range of 45 to 120 minutes. By selecting such conditions, an average particle diameter of the zinc sulfide phosphor of the hexagonal system can be made relatively fine.

And, the obtained baked product is thoroughly washed with ion-exchange water or the like, dried (e.g., at 120° C. for 20 hours), and sifted in order to remove coarse particles as required so to obtain a target zinc sulfide phosphor of a hexagonal system, namely a ZnS:Ag, M, Al phosphor or a ZnS:Cu, Au, Al phosphor. Besides, the average particle diameter of such a zinc sulfide phosphor of a hexagonal system can be adjusted to a range of the above formula A or B.

For the third phosphor for a display (red light-emitting phosphor) of the present invention, flux such as sodium carbonate or lithium phosphate is added to a coprecipitated product containing yttrium oxide and a prescribed amount of europium oxide as required. A required amount of sulfur is also added when oxysulfide is to be produced. After thoroughly mixing, they are charged into a heat resistant vessel such as a quartz crucible and baked.

It is preferable that the baking conditions are selected to be as follows so that an average particle diameter of the yttrium oxysulfide phosphor or the yttrium oxide phosphor satisfies the range of the above formula C. Specifically, it is preferable that the baking temperature is set to a low level or the baking time is set to a short level. From the above viewpoint, it is preferable that the baking temperature is in a range of 1000 to 1200° C., and the baking time is in a range of 60 to 360 minutes. It is also effective to set an amount of flux to be mixed with the phosphor raw material to a low level.

And, the obtained baked product is thoroughly washed with water such as ion-exchange water, dried and sifted to remove coarse particles as required so as to obtain a yttrium oxysulfide phosphor or a yttrium oxide phosphor having a target average particle diameter which satisfies the range of the formula C.

The first and second phosphors for a display of the present invention can be produced by applying various methods if they can produce a crystal structure of a hexagonal system. The first and second phosphors for a display of the present invention are not limited to have the above-described production methods and conditions. The same is also applied to the third phosphor for a display.

The phosphor for a display of the present invention is suitably used for a display which has an electron beam having an acceleration voltage in a range of 3 kV to 15 kv as an excitation source for the phosphor. An example of such a display is a field-emission display (FED) but not limited to it. When the phosphor for a display of the present invention is used for the FED or the like, accumulation of electrons due to a low acceleration voltage of the electron beam is suppressed, so that light emission characteristics (luminance characteristic etc.) of the phosphor can be stably maintained for a long period. Therefore, it is possible to provide an FED of which reliability and life characteristics are improved while satisfying the display characteristics such as luminance and chromaticity.

The field-emission display of the present invention comprises a back substrate (rear plate) having electron emission elements, a front substrate (face plate) which is disposed to face the electron emission elements and has a phosphor layer which emits color light by an electron beam emitted from the electron emission elements, and means which seal airtight a gap between the back substrate and the front substrate, wherein the phosphor layer includes the phosphor for a display of the present invention.

Figure 2:
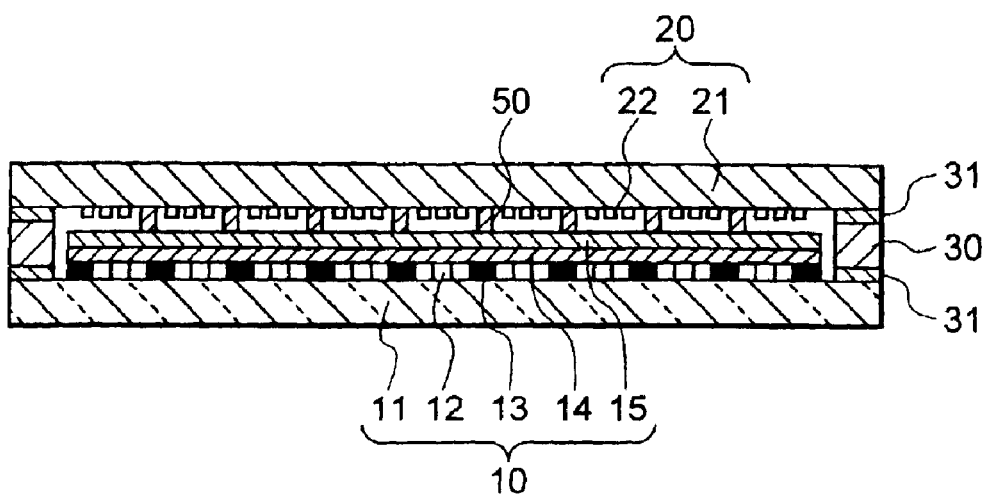
FIG. 2 is a sectional diagram showing a schematic structure of the main part of an embodiment of a field-emission display (FED) of the present invention.

FIG. 2 is a sectional diagram showing a schematic structure of an embodiment of the field-emission display (FED) of the present invention. A specific structure of the field-emission display will be described with reference to FIG. 2.

In FIG. 2, 10 indicates a face plate, which has a phosphor layer 12 formed on a transparent substrate such as a glass substrate 11. The phosphor layer 12 is configured to have a layer containing a blue light-emitting phosphor, a green light-emitting phosphor and a red light-emitting phosphor formed in correspondence with a pixel, and a black conductive material 13 for separating them. Among the phosphors for respective colors configuring the phosphor layer 12, at least one is comprised of the phosphor for a display of the present invention. Especially, it is preferable that the phosphor for a display of the present invention is applied to the phosphors for emitting blue light and green light.

The above phosphor layer 12 which emits blue, green and red light and the black conductive material 13 which divides them are sequentially formed repeatedly in a horizontal direction. The portion having the phosphor layer 12 and the black conductive material 13 becomes an image display area. Various structures can be applied to the layout structure of the phosphor layer 12 and the black conductive material 13. A metal back layer 14 is formed on the phosphor layer 12.

The metal back layer 14 is formed of a conductive thin film such as an Al film. In the light emitted from the phosphor layer 12, light advancing in a direction of a rear plate 20 which becomes the electron source is reflected by the metal back layer 14 to improve luminance. Besides, the metal back layer 14 has a function to prevent accumulation of electric charges by giving conductivity to the image display area of the face plate 10 and serves as an anode for the electron source of the rear plate 20.

The metal back layer 14 also has a function to prevent the phosphor layer 12 from being damaged by ions generated when gas remained in the face plate 10 or a vacuum vessel (envelop) is ionized by the electron beam. The metal back layer 14 also has an effect to prevent gas, which is produced from the phosphor layer 12, from being discharged into the vacuum vessel (envelop) at the time of use so to prevent a degree of vacuum from lowering. A getter film 15 which is formed of an evaporative getter material consisting of Ba or the like is formed on the metal back layer 14. The gas produced at the time of use is efficiently adsorbed by the getter film 15.

The rear plate 20 has a substrate 21 which is made of an insulating substrate such as a glass substrate or a ceramic substrate, or an Si substrate, and many electron emission elements 22 formed on the substrate 21. These electron emission elements 22 are provided with, for example, a field-emission cold cathode, a surface conductive electron emission element or the like. Unshown wiring is formed on the formed surface of the electron emission elements 22 of the rear plate 20. Specifically, many electron emission elements 22 are formed in a matrix pattern according to the phosphors of the respective pixels and have mutually intersecting wiring (X-Y wiring) which drives the matrix electron emission elements 22 on a one-by-one basis.

A support frame 30 seals airtight the space between the face plate 10 and the rear plate 20. The support frame 30 is joined to the face plate 10 and the rear plate 20 via a jointing material 31 which is frit glass, In or its alloy. A vacuum vessel as an envelop is configured of the face plate 10, the rear plate 20 and the support frame 30. The support frame 30 is provided with an unshown signal input terminal and line selection terminal. These terminals correspond to the intersecting wiring (X-Y wiring) of the rear plate 20.

When a flat type field-emission display is to be made large, deflection or the like may be caused because this device has a thin flat shape. In order to prevent such deflection or to give strength against atmospheric pressure, a reinforcing member (atmospheric pressure support member, spacer) 50 may be disposed appropriately between the face plate 10 and the rear plate 20 to comply with an intended strength.

According to the above FED, reliability and life characteristics can be improved substantially on the basis of the characteristics of the phosphor for a display of the present invention while display characteristics such as brightness, initial luminance and chromaticity are maintained. Specifically, it is possible to prove an FED which has characteristics such as a wide viewing angle, a quick response speed, small power consumption and the like in addition to the same basic display performance such as brightness, contrast and color reproducibility as the CRT and excels in reliability and life characteristics.

Then, specific embodiments of the present invention and the evaluated results will be described.

COMPARATIVE EXAMPLE 1

First, 0.95 g of silver nitrate ($AgNO_3$) and 13.5 g of aluminum nitrate ($Al(NO_3)_3 \cdot 9H_2O$) were added together with an appropriate amount of water to 1000 g of zinc sulfide (ZnS), and they were thoroughly mixed and dried. An appropriate amount of sulfur and activated carbon was added to the obtained phosphor raw material, and they were charged into a quartz crucible and baked in a reducing atmosphere. The baking conditions were 970° C. and 90 minutes.

The above baked product was thoroughly washed with water, dried, and further sifted to obtain a target ZnS:Ag, Al phosphor for emission of blue light. The obtained ZnS:Ag, Al phosphor was subjected to the X-ray diffraction to find that it had a crystal structure of a cubic system. For a content of each activator, Ag was $6\times10^{-4}$ g and Al was $9\times10^{-4}$ g against 1 g of ZnS. Such a ZnS:Ag, Al phosphor for emission of blue light was subjected to the characteristic evaluation to be described later.

Embodiment 1

To 1000 g of zinc sulfide (ZnS) were added 0.95 g of silver nitrate ($AgNO_3$) and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1100° C. and 60 minutes.

The above baked product was thoroughly washed with water, dried and further sifted to obtain a target ZnS:Ag, Al phosphor for emission of blue light. The obtained ZnS:Ag, Al phosphor was subjected to the X-ray diffraction to find that it had a crystal structure of a hexagonal system. For a content of each activator, Ag was $6\times10^{-4}$ g and Al was $9\times10^{-4}$ g against 1 g of ZnS. The above ZnS:Ag, Al phosphor for blue light emission was subjected to the characteristic evaluation to be described later.

Embodiment 2

To 1000 g of zinc sulfide (ZnS) were added 0.95 g of silver nitrate ($AgNO_3$), 0.035 g of chloroauric acid ($HAuCl_4.4H_2O$) and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1100° C. and 60 minutes.

The above-described baked product was thoroughly washed with water, dried and further sifted to obtain a target ZnS:Ag, Au, Al phosphor for emission of blue light. The obtained ZnS:Ag, Au, Al phosphor was subjected to the X-ray diffraction to find that it had a crystal structure of a hexagonal system. For a content of each activator, Ag was $6\times10^{-4}$ g, Au was $1.5\times10^{-5}$ g, and Al was $9\times10^{-4}$ g against 1 g of ZnS. The ZnS:Ag, Au, Al phosphor for emission of blue light was subjected to the characteristic evaluation to be described later.

Embodiment 3

To 1000 g of zinc sulfide (ZnS) were added 0.95 g of silver nitrate ($AgNO_3$), 0.02 g of copper sulfate ($CuSO4.5H_2O$) and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1100° C. and 60 minutes.

The above-described baked product was thoroughly washed with water, dried and further sifted to obtain a target ZnS:Ag, Cu, Al phosphor for emission of blue light. The obtained ZnS:Ag, Cu, Al phosphor was subjected to the X-ray diffraction to find that it had a crystal structure of a hexagonal system. For a content of each activator, Ag was $6\times10^{-4}$ g, Cu was $5\times10^{-6}$ g, and Al was $9\times10^{-4}$ g against 1 g of ZnS. The above ZnS:Ag, Cu, Al phosphor for emission of blue light was subjected to characteristic evaluation to be described later.

The blue light-emitting phosphors of the above Comparative Example 1 and Examples 1 to 3 were used to form respective phosphor films, and the obtained phosphor films were examined for emission luminance and emission chromaticity. Each phosphor film was formed by dispersing each blue light-emitting phosphor into an aqueous solution containing polyvinyl alcohol to prepare a slurry and applying the slurry onto a glass substrate by a spin coating machine. Each phosphor film was adjusted to have a thickness of $3\times10^{-3}$ mg/mm$^3$ (3 mg/cm$^3$) by adjusting the revolution speed of the spin coating machine and a slurry viscosity.

Emission luminance was measured by emitting an electron beam having an acceleration voltage of 10 kV and an electric current density of 1 $\mu A/mm^2$ to each phosphor film. Each luminance was determined as a relative value when the phosphor film according to Comparative Example 1 was assumed to have luminance of 100. Emission chromaticity was measured using MCPD-1000 produced by Otsuka Electronics Co., Ltd. as chromaticity measuring equipment. The emission chromaticity was measured in a darkroom in which chromaticity is not influenced from the outside at the time of light emission.

Besides, a luminance maintenance ratio of the phosphor film formed using each phosphor was determined as described below. First, an electron beam having an acceleration voltage of 10 kV and an electric current density of 100 $\mu A/mm^2$ was emitted to the phosphor film for 10 hours to forcedly degrade it. Then, an electron beam having an acceleration voltage of 10 kV and an electric current density of 1 $\mu A/mm^2$ was emitted to the forcedly degraded phosphor film, and its luminance was measured. It was compared with the luminance of a phosphor film, which was not forcedly degraded by the electron beam, undergone the same condition to determine a luminance maintenance ratio (%) of the forcedly degraded phosphor film. The luminance maintenance ratio was determined according to [(luminance of the forcedly degraded phosphor film/luminance of the non-degraded phosphor film)×100(%)]. The obtained results are shown in Table 1.

The above-described emission luminance, emission chromaticity and luminance maintenance ratio are indicated in an average value obtained by measuring those of ten samples which were selected at random from the respective test specimens.

TABLE 1

|  | Phosphor | Initial characteristics | | Luminance maintenance ratio (%) |
|---|---|---|---|---|
|  |  | Luminance (Blue component) (Relative value) | CIE chromaticity value (x, y) |  |
| CE1 | ZnS: Ag, Al (Cubic crystal) | 100 | 0.151, 0.063 | 71.2 |
| E1 | ZnS: Ag, Al (Hexagonal crystal) | 101.0 | 0.158, 0.041 | 76.3 |
| E2 | ZnS: Ag, Au, Al (Hexagonal crystal) | 97.3 | 0.161, 0.066 | 76.7 |
| E3 | ZnS: Ag, Cu, Al (Hexagonal crystal) | 98.2 | 0.160, 0.065 | 77.2 |

CE1 = Comparative Example 1;
E1 = Embodiment 1;
E2 = Embodiment 2;
E3 = Embodiment 3

It is apparent from Table 1 that the blue light-emitting phosphors (Embodiments 1 to 3) made of hexagonal zinc sulfide phosphor of the present invention have a high luminance maintenance ratio and resistance against the emission of an electron beam having a low voltage. It is also seen that the blue light-emitting phosphor is improved its blue light emission chromaticity by adding a very small amount of Au or Cu.

COMPARATIVE EXAMPLE 2

To 1000 g of zinc sulfide (ZnS) were added 0.6 g of copper sulfate ($CuSO_4.5H_2O$) and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 970° C. and 90 minutes.

The above baked product was thoroughly washed with water, dried, and further sifted to obtain a target ZnS:Cu, Al phosphor for emission of green light. The obtained ZnS:Cu, Al phosphor was subjected to the X-ray diffraction to find that it had a crystal structure of a cubic system. For a content of each activator, Cu was $1.5 \times 10^{-4}$ g and Al was $9 \times 10^{-4}$ g against 1 g of ZnS. This ZnS:Cu, Al phosphor for emission of green light was subjected to the characteristic evaluation to be described later.

Embodiment 4

To 1000 g of zinc sulfide (ZnS) were added 0.6 g of copper sulfate ($CuSO_4.5H_2O$) and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1100° C. and 60 minutes.

The above baked product was thoroughly washed with water, dried, and further sifted to obtain a target ZnS:Cu, Al phosphor for emission of green light. The obtained ZnS:Cu, Al phosphor was subjected to the X-ray diffraction to find that it had a crystal structure of a hexagonal system. For a content of each activator, Cu was $1.5 \times 10^{-4}$ g and Al was $9 \times 10^{-4}$ g against 1 g of ZnS. This ZnS:Cu, Al phosphor for green light emission was subjected to the characteristic evaluation to be described later.

Embodiment 5

To 1000 g of zinc sulfide (ZnS) were added 0.6 g of copper sulfate ($CuSO_4.5H_2O$), 0.33 g of chlorauric acid ($HAuCl_4.4H_2O$), and 13.5 g of aluminum nitrate ($Al(NO_3)_3.9H_2O$) together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1100° C. and 60 minutes.

The above baked product was thoroughly washed with water, dried, and further sifted to obtain a target ZnS:Cu, Au, Al phosphor for emission of green light. The obtained ZnS:Cu, Au, Al phosphor was subjected to the X-ray diffraction to find that it had a crystal structure of a hexagonal system. For a content of each activator, Cu was $1.5 \times 10^{-4}$ g, Au was $1.5 \times 10^{-4}$ g, and Al was $9 \times 10^{-4}$ g against 1 g of ZnS. This ZnS:Cu, Au, Al phosphor for green light emission was subjected to the characteristic evaluation to be described later.

Then, each of the green light-emitting phosphors of the above Comparative Example 2 and Embodiments 4 and 5 was used to form each phosphor film in the same way as the blue light-emitting phosphor, and emission luminance and emission chromaticity were examined under the same measuring conditions. The emission luminance was determined as a relative value assuming that luminance of the phosphor film of Comparative Example 2 was 100. A luminance maintenance ratio of each phosphor film which was forcedly degraded was also determined by the above-described method. The obtained results are shown in Table 2. Each value indicates an average value obtained by measuring ten samples in the same manner as in Embodiment 1.

TABLE 2

| | Phosphor | Initial characteristics | | Luminance maintenance ratio (%) |
|---|---|---|---|---|
| | | Luminance (Green component) (Relative value) | CIE chromaticity value (x, y) | |
| CE2 | ZnS: Cu, Al (Cubic crystal) | 100 | 0.294, 0.620 | 72.1 |
| E4 | ZnS: Cu, Al (Hexagonal crystal) | 88.6 | 0.218, 0.589 | 78.2 |
| E5 | ZnS: Cu, Au, Al (Hexagonal crystal) | 92.4 | 0.247, 0.602 | 77.2 |

CE2 = Comparative Example 2;
E4 = Embodiment 4;
E5 = Embodiment 5

It is apparent from Table 2 that each of the green light-emitting phosphors (Embodiments 4 and 5) made of the hexagonal zinc sulfide phosphor according to the present invention had a high luminance maintenance ratio and resistance against the irradiation of an electron beam having a low voltage. It is also apparent that addition of a very small amount of Au improves the green light emission chromaticity of the green light-emitting phosphor.

REFERENCE EXAMPLE 1

A $Y_2O_2S$:Eu phosphor was prepared as a red light-emitting phosphor and used to form a phosphor film. This phosphor film for emission of red light was also determined for a luminance maintenance ratio after the forced degradation according to the above-described method. As a result, a luminance maintenance ratio was 80.1%. Chromaticity of this red light-emitting phosphor at initial light emission was (x, y)=(0.659, 0.335) in the CIE chromaticity value.

Embodiment 6

The blue light-emitting phosphor of Embodiment 3, the green light-emitting phosphor of Embodiment 5 and the red light-emitting phosphor of Reference Example 1 each were used to form a phosphor layer on a glass substrate so to prepare a face plate. This face plate and a rear plate having many electron emission elements were assembled with a support flame between them, and the gap between them was sealed airtight by evacuating. The FED thus obtained was operated at normal temperature by rated operation for 1000 hours, and it was found that it had good display characteristics after the 1000-hour operation.

Embodiment 7

The blue light-emitting phosphor of Embodiment 7 was produced based on the assumption that it was excited by an electron beam having an acceleration voltage of 10 kV. This is also applied to the following Embodiments 8 to 11 and Comparative Examples 3 and 4. When an acceleration voltage $V_E$ was 10 kV, the formula A had values 3.1 to 4.6 $\mu$m (median of 3.83 $\mu$m).

First, 0.95 g of silver nitrate ($AgNO_3$), 13.5 g of aluminum nitrate ($Al(NO_3)_3 \cdot 9H_2O$), and 0.1 g of potassium chloride (KCl) as flux were added together with an appropriate amount of water to 1000 g of zinc sulfide (ZnS), and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

Then, the baked product was thoroughly washed with water, dried, and further sifted to obtain a target ZnS:Ag, Al phosphor for emission of blue light. The obtained ZnS:Ag, Al phosphor was undergone the X-ray diffraction to find that it had a crystal structure of a hexagonal system. For a content of each activator, Ag was $6 \times 10^{-4}$ g and Al was $9 \times 10^{-4}$ g against 1 g of mother ZnS.

Besides, the obtained phosphor powder had an average particle diameter of 4.0 μm. This average particle diameter was the same as the value obtained by measuring according to the above-described air douche (the same is applied hereinafter). This ZnS:Ag, Al phosphor for blue light emission was subjected to the characteristic evaluation to be described later.

Embodiment 8

To 1000 g of zinc sulfide (ZnS) were added 0.95 g of silver nitrate ($AgNO_3$), 0.005 g of chloroauric acid ($HAuCl_4 \cdot 4H_2O$), 13.5 g of aluminum nitrate ($Al(NO_3)_3 \cdot 9H_2O$) and 0.1 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

The above baked product was thoroughly washed with water, dried and further sifted to obtain a target ZnS:Ag, Au, Al phosphor for emission of blue light. The obtained ZnS:Ag, Au, Al phosphor was undergone the X-ray diffraction to find that it had a crystal structure of a hexagonal system. For a content of each activator, Ag was $6 \times 10^{-4}$ g, Au was $1 \times 10^{-6}$ g and Al was $9 \times 10^{-4}$ g against 1 g of mother ZnS. Besides, the obtained phosphor powder had an average particle diameter of 4.2 μm. This ZnS:Ag, Au, Al phosphor for blue light emission was subjected to the characteristic evaluation to be described later.

Embodiment 9

To 1000 g of zinc sulfide (ZnS) were added 0.95 g of silver nitrate ($AgNO_3$), 0.008 g of copper sulfate ($CuSO_4 \cdot 5H_2O$), 13.5 g of aluminum nitrate ($Al(NO_3)_3 \cdot 9H_2O$) and 0.05 g of potassium chloride (KCl) as flux together with an appropriate amount of water, and they were thoroughly mixed and dried. An appropriate amount of sulfur and activated carbon was added to the obtained phosphor raw material, they were charged into a quartz crucible and baked in a reducing atmosphere. The baking conditions were 1090° C. and 75 minutes.

The above baked product was thoroughly washed with water, dried and further sifted to obtain a target ZnS:Ag, Cu, Al phosphor for blue light emission. The obtained ZnS:Ag, Cu, Al phosphor was undergone the X-ray diffraction to find that it had a crystal structure of a hexagonal system. For a content of each activator, Ag was $6 \times 10^{-4}$ g, Cu was $2 \times 10^{-6}$ g, Al was $9 \times 10^{-4}$ g against 1 g of mother ZnS. Besides, the obtained phosphor powder had an average particle diameter of 3.5 μm. This ZnS:Ag, Cu, Al phosphor for blue light emission was subjected to the characteristic evaluation to be described later.

Embodiment 10

To 1000 g of zinc sulfide (ZnS) were added 0.95 g of silver nitrate ($AgNO_3$), 13.5 g of aluminum nitrate ($Al(NO_3)_3 \cdot 9H_2O$) and 0.25 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

The above baked product was thoroughly washed with water, dried, and further sifted to obtain a target ZnS:Ag, Al phosphor for emission of blue light. The obtained ZnS:Ag, Al phosphor was undergone the X-ray diffraction to find that it had a crystal structure of a hexagonal system. For a content of each activator, Ag was $6 \times 10^{-4}$ g and Al was $9 \times 10^{-4}$ g against 1 g of mother ZnS. But, the average particle diameter was 6.1 μm. This ZnS:Ag, Al phosphor for blue light emission was subjected to the characteristic evaluation to be described later.

Embodiment 11

To 1000 g of zinc sulfide (ZnS) were added 0.95 g of silver nitrate ($AgNO_3$), 13.5 g of aluminum nitrate ($Al(NO_3)_3 \cdot 9H_2O$) and 0.05 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

The above baked product was thoroughly washed with water, dried, and further sifted to obtain a target ZnS:Ag, Al phosphor for emission of blue light. The obtained ZnS:Ag, Al phosphor was undergone the X-ray diffraction to find that it had a crystal structure of a hexagonal system. A content of each activator was the same as in Comparative Example 3. But, the average particle diameter was 3.0 μm. This ZnS:Ag, Al phosphor for blue light emission was subjected to the characteristic evaluation to be described later.

COMPARATIVE EXAMPLE 3

To 1000 g of zinc sulfide (ZnS) were added 0.95 g of silver nitrate ($AgNO_3$), 13.5 g of aluminum nitrate ($Al(NO_3)_3 \cdot 9H_2O$) and 0.3 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 980° C. and 90 minutes.

The above baked product was thoroughly washed with water, dried and further sifted to obtain a target ZnS:Ag, Al phosphor for emission of blue light. The obtained ZnS:Ag, Al phosphor was undergone the X-ray diffraction to find that it had a crystal structure of a cubic system. For a content of each activator, Ag was $6 \times 10^{-4}$ g and Al was $9 \times 10^{-4}$ g against 1 g of mother ZnS. The average particle diameter was 6.3 μm. This ZnS:Ag, Al phosphor for blue light emission was subjected to the characteristic evaluation to be described later.

COMPARATIVE EXAMPLE 4

To 1000 g of zinc sulfide (ZnS) were added 0.95 g of silver nitrate ($AgNO_3$), 13.5 g of aluminum nitrate ($Al(NO_3)_3 \cdot 9H_2O$) and 0.3 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 980° C. and 75 minutes.

The above baked product was thoroughly washed with water, dried and further sifted to obtain a target ZnS:Ag, Al phosphor for emission of blue light. The obtained ZnS:Ag, Al phosphor was undergone the X-ray diffraction to find that it had a crystal structure of a cubic crystal. A content of each activator was the same as in Comparative Example 1. Besides, the average particle diameter was 5.8 μm. This ZnS:Ag, Al phosphor for blue light emission was subjected to the characteristic evaluation to be described later.

Each of the blue light-emitting phosphors of the above Embodiment 7 to 11 and Comparative Examples 3 and 4 was used to form a phosphor film in the same way as in Embodiment 1, and emission luminance (initial luminance) was examined under the same measuring conditions. The emission luminance was determined as a relative value based on the assumption that luminance of the phosphor film according to Comparative Example 3 was 100. Besides, a luminance maintenance ratio of each phosphor film after the forced degradation was determined according to the above-described method. The luminance maintenance ratio of the phosphor film was also determined when the electron beam had an acceleration voltage of 20 kV. The results are shown in Table 3. Each value is an average value of ten samples obtained by the same way as in Embodiment 1.

TABLE 3

| | Blue light-emitting phosphor (for 10 kV) | | | Luminance maintenance ratio (%) | |
|---|---|---|---|---|---|
| | Composition | Crystal structure | Average particle diameter (μm) | Initial luminance (10 kV) | Excitation voltage 10 kV | Excitation voltage 20 kV |
| E7 | ZnS: Ag, Al | Hexagonal crystal | 4.0 | 100 | 78 | 75 |
| E8 | ZnS: Ag, Au, Al | Hexagonal crystal | 4.2 | 99 | 77 | 74 |
| E9 | ZnS: Ag, Cu, Al | Hexagonal crystal | 3.5 | 98 | 75 | 77 |
| E10 | ZnS: Ag, Al | Hexagonal crystal | 6.1 | 104 | 67 | 74 |
| E11 | ZnS: Ag, Al | Hexagonal crystal | 3.0 | 93 | 68 | 73 |
| CE3 | ZnS: Ag, Al | Cubic crystal | 6.3 | 100 | 70 | 73 |
| CE4 | ZnS: Ag, Al | Cubit crystal | 5.8 | 100 | 64 | 66 |

E7 = Embodiment 7;
E8 = Embodiment 8;
E9 = Embodiment 9;
E10 = Embodiment 10;
E11 = Embodiment 11;
CE3 = Comparative Example 3;
CE4 = Comparative Example 4

It is apparent from Table 3 that the blue light-emitting phosphors (Embodiments 7 to 11) of the present invention had a high luminance maintenance ratio when the electron beam having an acceleration voltage of 10 kV was emitted. Especially, it is seen that a good luminance maintenance ratio can be obtained when the blue light-emitting phosphor powder has an average particle diameter in the range of the formula A. Therefore, it is seen that even when it is used for a display which is excited by an electron beam having a relatively low acceleration voltage (3 kV to 15 kV), luminance degradation with time of the phosphor film can be suppressed.

Then, a plurality of ZnS:Ag, Al phosphors of a hexagonal system having a different average particle diameter were produced with the baking conditions for the blue light-emitting phosphor having the same composition as in Embodiment 6 varied. They were measured for emission luminance of the phosphor films and the luminance maintenance ratios after the forced degradation. The results are shown in Table 4. It is apparent from Table 4 that when the blue light-emitting phosphor powder has an average particle diameter falling in the range of the formula A, a good luminance maintenance ratio can be obtained.

TABLE 4

| | Blue light-emitting phosphor (for 10 kV) | | | Luminance maintenance ratio (%) | |
|---|---|---|---|---|---|
| | Composition | Crystal structure | Average particle diameter (μm) | Initial luminance (10 kV) | Excitation voltage 10 kV | Excitation voltage 20 kV |
| S1 | ZnS: Ag, Al | Hexagonal crystal | 6.4 | 104 | 67 | 74 |
| S2 | ZnS: Ag, Al | Hexagonal crystal | 4.0 | 100 | 78 | 75 |
| S3 | ZnS: Ag, Al | Hexagonal crystal | 3.0 | 93 | 68 | 73 |
| S4 | ZnS: Ag, Al | Hexagonal crystal | 2.1 | 74 | 62 | 70 |

S1 = Specimen 1;
S2 = Specimen 2;
S3 = Specimen 3;
S4 = Specimen 4

Embodiment 12

The green light-emitting phosphor of Embodiment 12 was produced based on the assumption that it was excited by an electron beam having an acceleration voltage of 10 kV. The same is also applied to Embodiments 13 to 15 and Comparative Example 5 below. When the acceleration voltage $V_E$ is 10 kV, the value of the formula B becomes 3.1 to 4.7 μm (median of 3.93 μm).

First, 0.6 g of copper sulfate ($CuSO_4.5H_2O$), 13.5 g of aluminum nitrate ($Al(NO_3)_3.9H_2O$) and 0.1 g of potassium chloride (KCl) as flux were added together with an appropriate amount of water to 1000 g of zinc sulfide (ZnS), and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

Then, the baked product was thoroughly washed with water, dried and further sifted to obtain a target ZnS:Cu, Al phosphor for emission of green light. The obtained ZnS:Cu, Al phosphor was undergone the X-ray diffraction to find that it had a crystal structure of a hexagonal system. For a content of each activator, Cu was $1.5 \times 10^{-4}$ g and Al was $9 \times 10^{-4}$ g against 1 g of mother ZnS. Besides, the obtained phosphor powder had an average particle diameter of 3.9.m. This Zns:Ag, Al phosphor for green light emission was subjected to the characteristic evaluation to be described later.

Embodiment 13

To 1000 g of zinc sulfide (ZnS) were added 0.6 g of copper sulfate ($CuSO_4.5H_2O$), 0.22 g of chloroauric acid ($HAuC_4 \cdot 4H_2O$), 13.5 g of aluminum nitrate ($Al(NO_3)_3 \cdot 9H_2O$) and 0.1 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 75 minutes.

The above baked product was thoroughly washed with water, dried and further sifted to obtain a target ZnS:Cu, Au, Al phosphor for emission of green light. The obtained ZnS:Cu, Au, Al phosphor was undergone the X-ray diffraction to find that it had a crystal structure of a hexagonal crystal. For a content of each activator, Cu was $1.5 \times 10^{-4}$ g, Au was $1.5 \times 10^{-4}$ g and Al was $9 \times 10^{-4}$ g against 1 g of mother ZnS. Besides, the obtained phosphor powder had an average particle diameter of 4.1 µm. This ZnS:Cu, Au, Al phosphor for green light emission was subjected to the characteristic evaluation to be described later.

Embodiment 14

To 1000 g of zinc sulfide (ZnS) were added 0.6 g of copper sulfate ($CuSO_4 \cdot 5H_2O$), 13.5 g of aluminum nitrate ($Al(NO_3)_3 \cdot 9H_2O$) and 0.25 g of potassium chloride (KCl) as flux together with an appropriate amount of water, and they were thoroughly mixed and dried. An appropriate amount of sulfur and activated carbon was added to the obtained phosphor raw material, and they were baked in a reducing atmosphere. The baking conditions were 1090° C. and 75 minutes.

The above baked product was thoroughly washed with water, dried, and further sifted to obtain a target ZnS:Cu, Al phosphor for emission of green light. The obtained ZnS:Cu, Al phosphor was undergone the X-ray diffraction to find that it had a crystal structure of a hexagonal system. Each activator was contained in the same amount as in Embodiment 12. But, an average particle diameter was 5.8 µm. This ZnS:Cu, Al phosphor for green light emission was subjected to the characteristic evaluation to be described later.

Embodiment 15

To 1000 g of zinc sulfide (ZnS) were added 0.6 g of copper sulfate ($CuSO_4 \cdot 5H_2O$), 13.5 g of aluminum nitrate ($Al(NO_3)_3 \cdot 9H_2O$) and 0.05 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 1090° C. and 60 minutes.

The above baked product was thoroughly washed with water, dried and further sifted to obtain a target ZnS:Cu, Al phosphor for emission of green light. The obtained ZnS:Cu, Al phosphor was undergone the X-ray diffraction to find that it had a crystal structure of a hexagonal system. Each activator was contained in the same amount as in Embodiment 12. But, the average particle diameter was 2.8 µm. This ZnS:Cu, Al phosphor for green light emission was subjected to the characteristic evaluation to be described later.

COMPARATIVE EXAMPLE 5

To 1000 g of zinc sulfide (ZnS) were added 0.6 g of copper sulfate ($CuSO_4 \cdot 5H_2O$), 13.5 g of aluminum nitrate ($Al(NO_3)_3 \cdot 9H_2O$) and 0.3 g of potassium chloride (KCl) as flux together with an appropriate amount of water, and they were thoroughly mixed and dried. An appropriate amount of sulfur and activated carbon was added to the obtained phosphor raw material, and they were charged into a quartz crucible and baked in a reducing atmosphere. The baking conditions were 980° C. and 90 minutes.

The above baked product was thoroughly washed with water, dried and further sifted to obtain a target ZnS:Cu, Al phosphor for emission of green light. The obtained ZnS:Cu, Al phosphor was undergone the X-ray diffraction to find that it had a crystal structure of a cubic system. For a content of each activator, Cu was $1.5 \times 10^{-4}$ g and Al was $9 \times 10^{-4}$ g against 1 g of mother ZnS. The average particle diameter was 6.1 µm. This ZnS:Cu, Al phosphor for green light emission was subjected to the characteristic evaluation to be described later.

Each of the green light-emitting phosphors of the above-described Embodiments 12 to 15 and Comparative Example 5 was used to form a phosphor film in the same way as the blue light-emitting phosphor of Embodiment 7. And, its emission luminance (initial luminance) and luminance maintenance ratio were examined under the same measuring conditions. The emission luminance was determined as a relative value based on the assumption that luminance of the phosphor of Comparative Example 5 was 100. The results are shown in Table 5. Each value is an average value of ten samples determined in the same way as in Embodiment 1.

TABLE 5

| | | Green light-emitting phosphor (for 10 kV) | | | Luminance maintenance ratio (%) | |
|---|---|---|---|---|---|---|
| | Composition | Crystal structure | Average particle diameter (µm) | Initial luminance (10 kV) | Excitation voltage 10 kV | Excitation voltage 20 kV |
| E12 | ZnS: Cu, Al | Hexagonal crystal | 3.9 | 93 | 79 | 76 |
| E13 | ZnS: Cu, Au, Al | Hexagonal crystal | 4.1 | 94 | 78 | 76 |
| E14 | ZnS: Cu, Al | Hexagonal crystal | 5.8 | 96 | 68 | 75 |

TABLE 5-continued

| | Green light-emitting phosphor (for 10 kV) | | | Luminance maintenance ratio (%) | |
|---|---|---|---|---|---|
| | Composition | Crystal structure | Average particle diameter (μm) | Initial luminance (10 kV) | Excitation voltage 10 kV | Excitation voltage 20 kV |
| E15 | ZnS: Cu, Al | Hexagonal crystal | 2.8 | 90 | 71 | 77 |
| CE5 | ZnS: Cu, Al | Cubic crystal | 6.1 | 100 | 69 | 71 |

E12 = Embodiment 12;
E13 = Embodiment 13;
E14 = Embodiment 14;
E15 = Embodiment 15;
CE5 = Comparative Example 5

It is apparent from Table 5 that the green light-emitting phosphors (Embodiments 12 to 15) of the present invention had a high luminance maintenance ratio when an electron beam having an acceleration voltage of 10 kV was emitted. Especially, it is seen that when the green light-emitting phosphor powder has an average particle diameter falling in a range of the formula B, a good luminance maintenance ratio can be obtained. Therefore, it is apparent that even when it is used for a display which is excited by the electron beam having a relatively low acceleration voltage (3 kV to 15 kV), luminance degradation of the phosphor film with time can be suppressed.

Then, the baking conditions for the green light-emitting phosphor having the same composition as in Embodiment 12 were changed variously, and a plurality of ZnS:Cu, Al phosphors of a hexagonal system having a different average particle diameter were produced. They were also measured for emission luminance of the phosphor film and a luminance maintenance ratio after the forced degradation. The results are shown in Table 6. It is apparent from Table 6 that when the green light-emitting phosphor powder has an average particle diameter falling in the range of the formula B, a good luminance maintenance ratio can be obtained.

Embodiment 16

The $Y_2O_2S$:Eu phosphor for emission of red light of this Example 16 was produced based on the assumption that it was excited by an electron beam having an acceleration voltage of 10 kV. The same is also applied to Comparative Examples 6, 7 shown below. When the acceleration voltage $V_E$ is determined to be 10 kV, the value of the formula C becomes 3.9 to 5.9 μm (median of 4.93 μm).

First, 500 g of sulfur (S), 700 g of sodium carbonate ($Na_2CO_3$) and 70 g of lithium phosphate ($Li_3PO_4$) were mixed to 1000 g of yttrium oxide ($Y_2O_3$) coprecipitation containing 6.6% of europium oxide ($Eu_2O_3$) and 0.002% of terbium oxide ($Tb_4O_7$), and the mixture was charged into a quartz crucible and baked. The baking conditions were 1200° C. and 240 minutes.

Then, the baked product was washed with water and then with nitric acid in order to remove the flux, thoroughly washed with water, dried and further sifted to obtain a target $Y_2O_2S$:Eu phosphor for emission of red light. The obtained $Y_2O_2S$:Eu phosphor contained $6.6\times10^{-2}$ g of $Eu_2O_3$ and $2\times10^{-5}$ g of $Tb_4O_7$ against 1 g of $Y_2O_2S$:Eu. Besides, the average particle diameter was 5.2 μm. This $Y_2O_2S$:Eu phosphor for red light emission was subjected to the characteristic evaluation to be described later.

TABLE 6

| | Green light-emitting phosphor (for 10 kV) | | | Luminance maintenance ratio (%) | |
|---|---|---|---|---|---|
| | Composition | Crystal structure | Average particle diameter (μm) | Initial luminance (10 kV) | Excitation voltage 10 kV | Excitation voltage 20 kV |
| S1 | ZnS: Cu, Al | Hexagonal crystal | 5.8 | 96 | 68 | 75 |
| S2 | ZnS: Cu, Al | Hexagonal crystal | 3.9 | 93 | 79 | 76 |
| S3 | ZnS: Cu, Al | Hexagonal crystal | 2.8 | 90 | 71 | 77 |
| S4 | ZnS: Cu, Al | Hexagonal crystal | 2.2 | 69 | 65 | 73 |

S1 = Specimen 1;
S2 = Specimen 2;
S3 = Specimen 3;
S4 = Specimen 4

COMPARATIVE EXAMPLE 6

To 1000 g of yttrium oxide ($Y_2O_3$) coprecipitation containing 6.6% of europium oxide ($Eu_2O_3$) and 0.002% of terbium oxide ($Tb_4O_7$) were mixed 500 g of sulfur (S), 700 g of sodium carbonate ($Na_2CO_3$) and 125 g of lithium phosphate ($Li_3PO_4$), and the mixture was charged into a quartz crucible and baked. The baking conditions were 1200° C. and 240 minutes.

The above baked product was washed with water and with nitric acid in order to remove the flux, then thoroughly washed with water and dried, and sifted to obtain a target $Y_2O_2S$:Eu phosphor for emission of red light. The obtained $Y_2O_2S$:Eu phosphor contained $6.6\times10^{-2}$ g of $Eu_2O_3$ and $2\times10^{-5}$ g of $Tb_4O_7$ against 1 g of $Y_2O_2S$:Eu. Besides, the average particle diameter was 6.8 μm. This $Y_2O_2S$:Eu phosphor for red light emission was subjected to the characteristic evaluation to be described later.

COMPARATIVE EXAMPLE 7

To 1000 g of yttrium oxide ($Y_2O_3$) coprecipitation containing 6.6% of europium oxide ($Eu_2O_3$) and 0.002% of terbium oxide ($Tb_4O_7$) were mixed 500 g of sulfur (S), 700 g of sodium carbonate ($Na_2CO_3$) and 35 g of lithium phosphate ($Li_3PO_4$), and the mixture was charged into a quartz crucible and baked. The baking conditions were 1200° C. and 240 minutes.

The above baked product was washed with water and then with nitric acid in order to remove the flux, then thoroughly washed with water and dried, and further sifted to obtain a target $Y_2O_2S$:Eu phosphor for emission of red light. The obtained $Y_2O_2S$:Eu phosphor contained $6.6\times10^{-2}$ g of $Eu_2O_3$ and $2\times10^{-5}$ g of $Tb_4O_7$ against 1 g of $Y_2O_2S$:Eu. Besides, the average particle diameter was 4.3 μm. This $Y_2O_2S$:Eu phosphor for red light emission was subjected to the characteristic evaluation to be described later.

Each of the red light-emitting phosphors of the above Embodiment 16 and Comparative Examples 6 and 7 was used to form a phosphor film in the same way as the blue light-emitting phosphor of Embodiment 7, and it was examined for emission luminance and a luminance maintenance ratio under the same measuring conditions. The emission luminance was determined as a relative value based on the assumption that the luminance of the phosphor of Comparative Example 6 was 100. The results are shown in Table 7. Each value is an average value of ten samples obtained by the same way as in Embodiment 1.

TABLE 7

| Red Light-emitting phosphor (for 10 kV) | | | Initial Luminance (10 kV) | Luminance maintenance ratio (%) | |
|---|---|---|---|---|---|
| | Composition | Average particle diameter (μm) | | Excitation voltage 10 kV | Excitation voltage 20 kV |
| E16 | $Y_2O_2S$: Eu | 5.2 | 98.5 | 80 | 80 |
| CE6 | $Y_2O_2S$: Eu | 6.8 | 100 | 76 | 83 |
| CE7 | $Y_2O_2S$: Eu | 4.3 | 96 | 77 | 76 |

E16 = Embodiment 16;
CE6 = Comparative Example 6;
CE7 = Comparative Example 7

It is apparent from Table 7 that the red light-emitting phosphor (Embodiment 16) of the present invention has a high luminance maintenance ratio when an electron beam having an acceleration voltage of 10 kV is emitted. Therefore, even when it is used for a display excited by an electron beam having a relatively low acceleration voltage (3 kV to 15 kV), luminance degradation of the phosphor film with time can be suppressed.

Embodiment 17

The blue light-emitting phosphor according to Embodiment 7, the green light-emitting phosphor according to Embodiment 12 and the red light-emitting phosphor according to claim 16 were used to form a phosphor layer on a glass substrate so to form a face plate. The face plate and a rear plate having many electron emission elements were assembled with a support frame between them, and the gap between them was sealed airtight by evacuating. The luminance maintenance ratio (excitation voltage of 10 kV) of each phosphor film for the FED obtained as described above was determined according to the above-described method. The obtained values are shown in Table 8.

COMPARATIVE EXAMPLE 8

The blue light-emitting phosphor according to Comparative Example 3, the green light-emitting phosphor according to Comparative Example 5 and the red light-emitting phosphor according to Comparative Example 6 were used to assemble an FED in the same way as in Embodiment 17. The luminance maintenance ratio (excitation voltage of 10 kV) of each phosphor film for the FED was determined according to the above-described method. The obtained values are shown in Table 8.

TABLE 8

| | | Embodiment 16 | Comparative Example 8 |
|---|---|---|---|
| Blue light-emitting phosphor | | Hexa-Zns: Ag, Al (4.0 μm) | Cub-ZnS: Ag, Al (6.3 μm) |
| Green light-emitting phosphor | | Hexa-Zns: Cu, Al (3.9 μm) | CuB-ZnS: Cu, Al (6.1 μm) |
| Red light-emitting phosphor | | $Y_2O_2S$: Eu (5.2 μm) | $Y_2O_2S$: Eu (6.8 μm) |
| Luminance maintenance ratio (%) | Blue | 78 | 70 |
| | Green | 79 | 69 |
| | Red | 80 | 76 |

It is apparent from Table 8 that an FED using the phosphors (respective phosphors for emission of blue, green and red light) of the present invention has respective phosphor films which have a high luminance maintenance ratio and a little difference among the luminance maintenance ratios of the respective phosphor films, so that the FED can be prevented from having color drift substantially. Therefore, it is possible to improve the display characteristics, reliability and life characteristics of the FED.

Embodiments 18 to 22

In Embodiments 18 to 22, zinc sulfide phosphors for emission of blue light, which were assumed to be excited by an electron beam having an acceleration voltage of 5 kV, were produced. When an acceleration voltage $V_E$ is 5 kV, the value of the formula A becomes 2.3 to 3.5 μm (median of 2.9 μm). The blue light-emitting phosphor of each Embodiment was produced with the amount of flux and baking conditions in Embodiments 7 to 11 varied. Each of the obtained zinc sulfide phosphors for blue light emission has an average particle diameter as shown in Table 9.

Each of the blue light-emitting phosphors of the above Embodiments 18 to 22 was used to form a phosphor film in the same way as the blue light-emitting phosphor of Embodiment 7. And, the emission luminance and luminance maintenance ratio of each phosphor film were determined. The emission luminance was measured by emitting an electron beam having an acceleration voltage of 5 kV and an electric current density of 1 μA/mm² to each phosphor film. Each of luminance was determined as a relative value based on the assumption that the luminance of the phosphor film of Embodiment 18 was 100. The luminance maintenance ratio of the phosphor film was determined by emitting an electron beam having an acceleration voltage of 5 kV and an electric current density of 100 μA/mm² to each phosphor film for 10 hours to forcedly degrade it. And, the luminance maintenance ratio was also determined by forcedly degrading by an electron beam having an acceleration voltage of 20 kV. The results are shown in Table 9. Each value is an average value of ten samples obtained by the same manner as in Embodiment 1.

TABLE 9

| | Blue light-emitting phosphor (for 5 kV) | | | | Luminance maintenance ratio (%) | |
| | Composition | Crystal structure | Average particle diameter (μm) | Initial luminance (5 kV) | Excitation voltage 5 kV | Excitation voltage 20 kV |
|---|---|---|---|---|---|---|
| E18 | ZnS: Ag, Al | Hexagonal crystal | 3.0 | 100 | 82 | 73 |
| E19 | ZnS: Ag, Au, Al | Hexagonal crystal | 3.3 | 98 | 82 | 71 |
| E20 | ZnS: Ag, Cu, Al | Hexagonal crystal | 3.1 | 99 | 83 | 72 |
| E21 | ZnS: Ag, Al | Hexagonal crystal | 4.0 | 107 | 78 | 75 |
| E22 | ZnS: Ag, Al | Hexagonal crystal | 2.1 | 75 | 73 | 65 |

E18 = Embodiment 18;
E19 = Embodiment 19;
E20 = Embodiment 20;
E21 = Embodiment 21;
E22 = Embodiment 22

Embodiments 23 to 26

In Embodiments 23 to 26, zinc sulfide phosphors for emission of green light were produced based on the assumption that they were excited by an electron beam having an acceleration voltage of 5 kV. When the acceleration voltage $V_E$ is 5 kV, the value of the formula B becomes 2.3 to 3.4 μm (median of 2.9 μm). The green light-emitting phosphor of each Embodiment was produced with the amount of flux and baking conditions of Embodiments 12 to 15 varied. The average particle diameter of each of the zinc sulfide phosphors for green light emission is shown in Table 10.

Each of the green light-emitting phosphors of the above Embodiments 23 to 26 was used to form a phosphor film in the same way as the blue light-emitting phosphor of Embodiment 18. And, the emission luminance and luminance maintenance ratio of each phosphor film were determined in the same way. Each of luminance was determined as a relative value based on the assumption that the luminance of the phosphor film of Embodiment 23 was 100. The results are shown in Table 10. Each value is an average value of ten samples determined in the same way as in Embodiment 1.

TABLE 10

| | Green light-emitting phosphor (for 5 kV) | | | | Luminance maintenance ratio (%) | |
| | Composition | Crystal structure | Average particle diameter (μm) | Initial luminance (5 kV) | Excitation voltage 5 kV | Excitation voltage 20 kV |
|---|---|---|---|---|---|---|
| E23 | ZnS: Cu, Al | Hexagonal crystal | 2.8 | 100 | 84 | 77 |
| E24 | ZnS: Cu, Au, Al | Hexagonal crystal | 3.1 | 99 | 83 | 78 |
| E25 | ZnS: Cu, Al | Hexagonal crystal | 4.1 | 105 | 79 | 76 |
| E26 | ZnS: Cu, Al | Hexagonal crystal | 2.2 | 80 | 76 | 71 |

E23 = Embodiment 23;
E24 = Embodiment 24;
E25 = Embodiment 25;
E26 = Embodiment 26

Industrial Applicability

As apparent from the above embodiments, the phosphor for a display of the present invention is prevented from having the characteristics (such as luminance degradation) lowered substantially which may result from a slow acceleration voltage of an electron beam. Therefore, good emission luminance can be maintained for a long time by the phosphor for a display of the present invention. And, a field-emission display excelling in display characteristics, reliability, life characteristics and the like can be provided by using the phosphor for a display of the present invention.

What is claimed is:

1. A phosphor for a display, which is provided with a zinc sulfide phosphor which is excited by an electron beam having an acceleration voltage of 3 kV to 15 kV to emit blue light, wherein the zinc sulfide phosphor has a crystal structure of a hexagonal system and a composition indicated by the general formula:

$ZnS:Ag_a,M_b,Al_c$ where, M indicates at least one element selected from Au and Cu, a, b and c indicate an amount against 1 g of zinc sulfide which is a mother phosphor, Ag indicates a range of $1\times10^{-6} \leq a \leq 2\times10^{-3}$ g, M indicates a range of $0 \leq 3\times10^{-5}$ g, and Al indicates a arange of $1\times10^{-5} \leq c \leq 5\times10^{-3}$ g.

2. The phosphor for a display according to claim 1, wherein the zinc sulfide phosphor for blue light emission has an average particle diameter in a range of $(0.0169\times V_E^{1.9}+2.49)\pm 20\%[\mu m]$ when the electron beam has an acceleration voltage $V_E$ (kV).

3. The phosphor for a display according to claim 1, wherein the phosphor is used as blue light-emitting phosphor for a field-emission display.

4. The phosphor for a display according to claim 1, wherein the zinc sulfide phosphor for blue light emission has a composition indicated by the general formula:

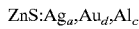

ZnS:Ag$_a$,Au$_d$,Al$_c$ where, a, d and c indicate an amount against 1 g of zinc sulfide which is a mother phosphor, Ag is in a range of $1\times10^{-6} \leq a \leq 2\times10^{-3}$ g, Au is in a range of $0 \leq d \leq 1.5\times10^{-5}$ g, and Al is in a range of $1\times10^{-5} \leq c \leq 5\times10^{-3}$ g.

5. The phosphor for a display according to claim 1, wherein the zinc sulfide phosphor for blue light emission has a composition indicated by the general formula:

ZnS:Ag$_a$,Cu$_e$,Al$_c$ where, a, e and c indicate an amount against 1 g of zinc sulfide which is a mother phosphor, Ag is in a range of $1\times10^{-6} \leq a \leq 2\times10^{-3}$ g, Cu is in a range of $0 \leq e \leq 0.5\times10^{-5}$ g, and Al is in a range of $1\times10^{-5} \leq c \leq 5\times10^{-3}$ g.

6. The phosphor for a display according to claim 1, wherein the zinc sulfide phosphor is excited by emitting the electron beam and emits blue light which has emission chromaticity with an x value in a range of 0.15 to 0.17 and a y value in a range of 0.035 to 0.075 in CIE chromaticity value.

7. A phosphor for a display, which is provided with a zinc sulfide phosphor which is excited by an electron beam having an acceleration voltage of 3 kV to 15 kV to emit green light, wherein the zinc sulfide phosphor has a crystal structure of a hexagonal system and a composition indicated by the general formula:

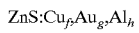

ZnS:Cu$_f$,Au$_g$,Al$_h$ where, f, g and h indicate an amount against 1 g of zinc sulfide which is a mother phosphor, Cu is in a range of $1\times10^{-5} \leq f \leq 1\times10^{-3}$ g, Au is in a range of $0 \leq g \leq 3\times10^{-4}$ g, and Al is in a range of $1\times10^{-5} \leq h \leq 5\times10^{-3}$ g.

8. The phosphor for a display according to claim 7, wherein the zinc sulfide phosphor for emission of green light has an average particle diameter in a range of $(0.017\times V_E^{1.9}+2.58)\pm 20\%[\mu m]$ when the electron beam has an acceleration voltage $V_E$ (kV).

9. The phosphor for a display according to claim 7, wherein the zinc sulfide phosphor is excited by emitting the electron beam and emits green light which has emission chromaticity with an x value in a range of 0.21 to 0.27 and a y value in a range of 0.58 to 0.62 in CIE chromaticity value.

10. The phosphor for a display according to claim 7, wherein the phosphor is used as a green light-emitting phosphor for a field-emission display.

11. A field-emission display comprising:

a back substrate having electron emission elements;

a front substrate which is disposed to face the electron emission elements and has a phosphor layer which emits light by an electron beam emitted from the electron emission elements; and means which seal airtight a gap between the back substrate and the front substrate, wherein the phosphor layer contains at least one selected from a blue light emission component having a phosphor for a display, which is provided with a zinc sulfide phosphor which is excited by an electron beam having an acceleration voltage of 3 kV to 15 kV to emit blue light, where the zinc sulfide phosphor has a crystal structure of a hexagonal system and a composition indicated by the general formula:

ZnS:Ag$_a$,M$_b$,Al$_c$ where, M indicates at least one element selected from Au and Cu, a, b and c indicate an amount against 1 g of zinc sulfide which is a mother phosphor, Ag indicates a range of $1\times10^{-6} \leq a \leq 2\times10^{-3}$ g, M indicates a range of $0 \leq b \leq 3\times10^{-5}$ g, and Al indicates a range of $1\times10^{-5} \leq c \leq 5\times10^{-3}$ g; and a green light emission component having a phosphor for a display, which is provided with a zinc sulfide phosphor which is excited by an electron beam having an acceleration voltage of 3 kV to 15 kV to emit green light, where the zinc sulfide phosphor has a crystal structure of a hexagonal system and a composition indicated by the general formula:

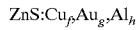

ZnS:Cu$_f$,Au$_g$,Al$_h$ where, f, g and h indicate an amount aaainst 1 g of zinc sulfide which is a mother phosphor, Cu is in a range of $1\times10^{-5} \leq f \leq 1\times10^{-3}$ g, Au is in a range of $0 \leq g \leq 3\times10^{-4}$ g, and Al is in a range of $1\times10^{-5} \leq h \leq 5\times10^{-3}$ g.

12. The field-emission display according to claim 11, wherein the phosphor layer contains the blue light emission component and the green light emission component; and the phosphor layer further contains a red light emission component.

13. The field-emission display according to claim 12, wherein the red light emission component has a yttrium oxysulfide phosphor or a yttrium oxide phosphor.

* * * * *